United States Patent [19]
Paxton

[11] Patent Number: 5,960,050
[45] Date of Patent: Sep. 28, 1999

[54] METHOD OF FISSION HEAT FLUX DETERMINATION FROM EXPERIMENTAL DATA

[75] Inventor: Frank A. Paxton, Schenectady, N.Y.

[73] Assignee: The United States as represented by the United States Department of Energy, Washington, D.C.

[21] Appl. No.: 09/018,955

[22] Filed: Feb. 5, 1998

[51] Int. Cl.[6] .................................................. G21C 17/112
[52] U.S. Cl. .......................................... 376/247; 376/254
[58] Field of Search ..................................... 376/202, 247, 376/254, 257, 259, 463; 374/29–30

[56] References Cited

U.S. PATENT DOCUMENTS 3,411,987  11/1968  Fitzpatrick ............................... 376/247
4,725,399   2/1988  McCulloch et al. ..................... 376/247
5,084,229   1/1992  Welsh et al. ............................. 376/247

*Primary Examiner*—Daniel D. Wasil
*Attorney, Agent, or Firm*—John T. Lucas; William R. Moser; Paul A. Gottlieb

[57] ABSTRACT

A method is provided for determining the fission heat flux of a prime specimen inserted into a specimen of a test reactor. A pair of thermocouple test specimens are positioned at the same level in the holder and a determination is made of various experimental data including the temperature of the thermocouple test specimens, the temperature of bulk water channels located in the test holder, the gamma scan count ratios for the thermocouple test specimens and the prime specimen, and the thicknesses of the outer clads, the fuel fillers, and the backclad of the thermocouple test specimen. Using this experimental data, the absolute value of the fission heat flux for the thermocouple test specimens and prime specimen can be calculated.

5 Claims, 1 Drawing Sheet

METHOD OF FISSION HEAT FLUX DETERMINATION FROM EXPERIMENTAL DATA

FIELD OF THE INVENTION

The present invention relates generally to a unique method of determining the fission heat flux for Uranium 235 (U235) fuel-bearing specimens inserted in a test holder of a nuclear reactor, and in particular to a method where the absolute value of the fission flux is obtained without requiring the specimen grams U235/cc, but instead by using experimental data from a thermocouple test specimen.

BACKGROUND OF THE INVENTION

Prior methods of determining the fission flux within the test specimen generally requires a detailed knowledge of the fuel region properties. This knowledge allows a determination of the conductivity, k, as a function of temperature. The French scientist J. B. J. Fourier in 1822 proposed in Cartesian coordinates the one-dimensional heat transfer equation $q=-kA\,dT/dx$, where q=heat rate, T=temperature, A=area, and dx=incremental thickness. This equation in most simple applications leads to $\int k\,dT=S$, where k must be known as a function of T to solve this equation. While these previous methods depend strongly on stated fuel properties, the method of the invention, as described below, relies more on experimental data, and the assumption of a similar thermal conductivity temperature variation.

SUMMARY OF THE INVENTION

In accordance with the invention, a unique method of determining the fission flux (usually given in BTU/hr/ft2) is provided which relies on experimental data that can be readily gathered. The data gathered includes the temperature of two thermocouple test specimens (TC's), each TC's gamma scan count ratio, and certain dimensional data. This enables the absolute fission fluxes for the two TC specimens to be obtained, and once this is done, by then using the gamma scan count ratio for the prime specimens in the same holder, the fission flux of the prime specimens can be readily derived. Assuming that the prime specimens have a similar conductivity temperature variation to that of the TC's, then their maximum temperatures can also be determined.

As mentioned above, in the prior art methods of determining fission heat flux, the makeup of the fuel region must be known in detail and conductivity equations then need to be formulated. In contrast, the method of the present invention, in many cases when there are reliable measurements, enables the absolute flux and temperature values to be obtained without requiring this kind of detail. The method of the present invention can be used to lend support in confirming answers provided by conventional methods and programs for determining fission flux, to give an indication as to the accuracy of the measurements for particular test specimens, and to provide insight towards developing future fission flux programs.

The method of the present invention enables absolute fission fluxes and temperatures to be obtained for U235 fuel-bearing specimens without using conventional techniques. Further, the invention provides that the thermocoupled test specimens are symmetrically placed in a reactor test holder at the same elevation, and, under these circumstances, enables an estimate of the effective grams of U235/cc of the prime specimen remaining to be obtained. Additionally, if the microscopic absorption to fission capture ratio (1+Alpha) is known, the prime specimen U235 fissions remaining can also be determined. It is noted that for the fissions estimate, any significant contributions to the self-shielding from material other than the U235 must also be known.

Further, in cases where specimen conductivities vary similarly with temperature, and gamma-scan count ratios relate to the heat source, the present method can also be used to find the magnitude of the heat source.

In accordance with a preferred embodiment of the invention, a method is provided for determining the absolute value of fission flux of a prime fuel-bearing specimen containing Uranium 235 inserted into a test holder of a nuclear reactor, the method comprising: inserting into the test holder of the nuclear reactor at least one prime specimen, a plurality of bulk water channels and at least two thermocouple test specimens, the thermocouple test specimens being positioned at the same level in said test holder and comprising first and second outer clads, a central backclad and first and second fuel fillers disposed between respective outer clads and the backclad; determining the temperature of the thermocouple test specimens and the bulk water channels, the gamma scan count ratios for said thermocouple test specimens and for at least one prime specimen, the thicknesses of the outer clads, fuel fillers and backclad of the thermocouple test specimens, and the surface water channel heat transfer coefficient of the thermocouple test specimens; calculating, using the temperatures of said thermocouple test specimens, the ratio of the gamma scan counts of said thermocouple test specimens, the temperature of the bulk water channels; the thicknesses of the outer clad, the fuel fillers and the backclad, and the bulk water channel heat transfer coefficient, the absolute value of the fission heat fluxes for the thermocouple test specimens; and calculating, using the absolute value of the fission heat fluxes for the thermocouple test specimens so determined and the gamma scan ratio for the at least one prime specimen, the absolute value of the fission heat flux for the prime specimen.

Other features and advantages of the invention will be set forth in, or apparent from, the following detailed description of the preferred embodiments of the invention.

DETAILED DESCRIPTION OF THE PREFERRED EMBODIMENTS

Figure 1:
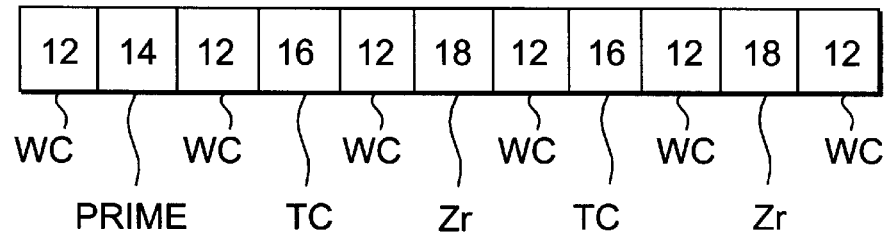
FIG. 1 is a schematic cross-sectional view of a first embodiment of a test holder used in the method of the invention.

Referring to FIG. 1, there is shown a schematic illustration of a test holder, generally denoted 10, used in accordance with the method of the present invention to determine fission heat flux for a Uranium 235 fuel-bearing specimen used in a nuclear reactor. The test holder 10 is positioned in a conventional pressurized test loop (not shown) of an ATR reactor to take experimental data used in deriving the absolute value of the thermal fission flux of a prime specimen.

Test holder 10 is an SW101-type F 2×3 holder and is shown in cross-section as having a series of components positioned in a row. Specifically, the following components are positioned in a row proceeding from left to right: a first bulk water channel (WC) 12; a prime specimen (PRIME) 14; a second WC 12; a first thermocouple test specimen (TC) 16; a third WC 12; a first Zirconium specimen (Zr) 18; a fourth WC 12; a second TC 16; a fifth WC 12; a second Zr specimen 18; and a sixth WC 12. As discussed above, the TC's 16 must be positioned at the same level and this is accomplished by using the test holder 10.

Figure 2:
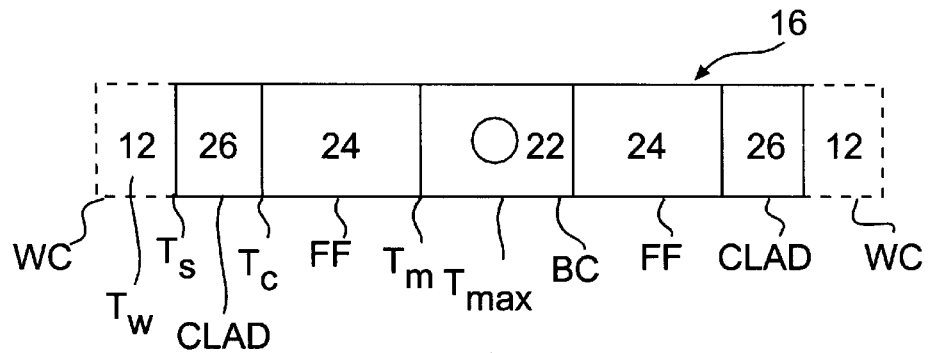
FIG. 2 is a schematic cross-sectional view of a thermocouple specimen used in the method of the invention.

FIG. 2 illustrates the composition of each TC 16 and shows in cross section that TC 16 comprises a central backclad (BC) 22. Two outer clads (CLAD) 26 and two fuel fillers (FF) 24 are disposed between the backclad 22 and the two outer clads 26, respectively. Two WC's 12 are shown in dashed lines to help illustrate the positioning of WC's 12 in test holder 10. As mentioned above and as discussed in more detail below, various temperature data is required to ultimately determine the fission flux; FIG. 2 illustrates that the temperature (TM) is measured at the interface between backclad 22 and fuel filler 24. The maximum temperature ($T_{MAX}$) of backclad 22 is also measured, as is temperature of the bulk WC ($T_W$). The temperature ($T_C$) at the interface between fuel filler 24 and clad 26, and the temperature ($T_S$) between clad 26 and WC 12 is to be determined later.

Figure 3:
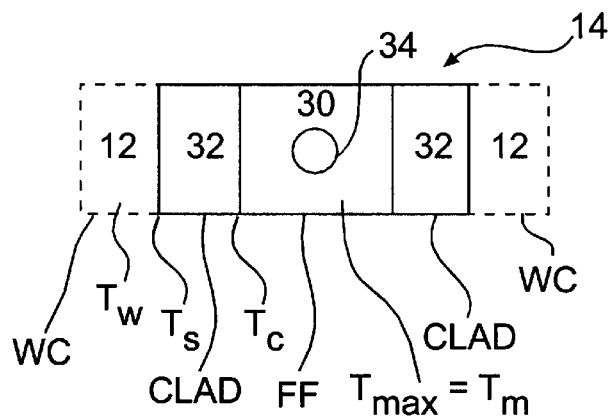
FIG. 3 is a schematic cross-sectional view of a prime specimen used in the method of the invention.

FIG. 3 illustrates the composition of prime specimen 14 and shows in cross-section that prime specimen 14 comprises a fuel filler 30 disposed adjacent, and between, a pair of clad 32. The first and second WC's 12 are shown in dashed lines to help illustrate the positioning of prime specimen 14 in test holder 10. Since there is no backclad in prime specimen 14, the temperature of the prime specimen 14 is assumed to be the same as the maximum temperature for this type of specimen (i.e., $T_M = T_{MAX}$) and the temperature ($T_C$) is that determined at the interface between clad 32 and fuel filler 30.

Figure 4:
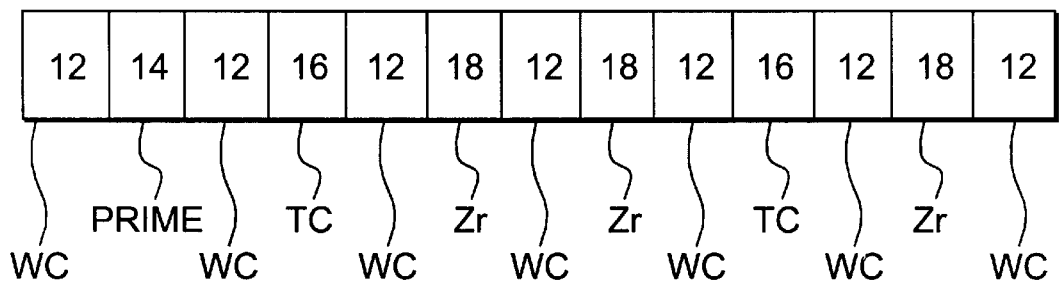
FIG. 4 is a schematic cross-sectional view of a second embodiment of a test holder used in the method of the invention.

FIG. 4 illustrates a second embodiment of test holder 10 which is an SE93-type B 2×4 holder. The configuration is similar to that illustrated in FIG. 1, except after the fourth WC (proceeding left to right), there is disposed the second Zr specimen 18, the fifth WC 12, the second TC 16, the sixth WC 12, a third Zr specimen 18, and lastly a seventh WC 12.

The method of the present invention will be discussed below as part of a mathematical proof which demonstrates that the method does indeed yield a reliable value for the fission heat flux of a prime specimen, e.g., corresponding to specimen 14 based on readily obtainable experimental data.

As mentioned above, the method of the present invention requires that two TC's 16 be located at the same elevation. In addition, it is also necessary to measure the temperatures of the WC's 12, and the temperatures of the TC's 16 and to measure the gamma-scan count ratio of the TC's 16 and the prime specimen 14. The transfer heat coefficient ($H_{COEF}$) for the water channel flow is also required, and can be calculated from the measured flow rate of the water channels 12. The thickness of the backclad 22, fuel filler 24, and clad 26 of the TC's 16 must also be determined. Further, the ATR reactor lobe power (POWER) and axial factor for gamma heat (AXF) is used to separate the fission heat from the total heat so that the absolute value of the fission heat fluxes of the TC's 16 can then be determined. Once the absolute value of the fission heat fluxes of the TC's 16 is determined, the absolute value of the fission heat flux of the prime specimen can then be easily determined as shown below.

To facilitate the explanation of the method of the invention, Zirconium (Zr) is assumed for the clad and backclad material. The thermal conductivity for the Zr regions can be expressed as a linear function of the average temperature. In addition to the heat generated from fission, there is also gamma heat throughout the specimen. Set forth below is a somewhat detailed derivation for the linearly varying conductivity versus temperature case. For clarification of the derivation, it may be helpful to note the following term abbreviations.

Term Abbreviations
P=Prime Specimen
TC=Thermocouple Test Specimen
WC=Water Channel
FF=Fuel filler
BC=Backclad
H=Transfer heat coefficient for WC flow
a=6, b=5e-3; ab=a/b=1200 (material constants for Zr)
$T_w$=Bulk WC temperature
$T_s$=Temperature at interface between the outer clad and WC in a TC or the temperature between the clad and WC in a prime specimen
$T_L$=Linear average temperature over fuel
$T_M$=Temperature at interface between the BC and FF in a TC, or maximum temperature of a prime specimen
$k_w$=Pseudo WC thermal conductivity
$k_s$=Pseudo WC film thermal conductivity
$k_c$=Clad thermal conductivity
$k_m$=Pseudo thermal conductivity based on $T_M$
$Q_T$=Total heat generation for BC, FF, Clad
$Q_G$=Gamma heat generation
$Q_F$=Fission heat generation
$S_C$=Clad heat source
$S_F$=Fuel heat source
$t_s$=Total specimen thickness
$t_c$=Thickness of outer clad of TC
$t_f$=Thickness of fuel filler of TC
$t_{bc}$=Thickness of backclad of TC
$a_c = t_c/t_s$=Clad gamma heat multiplication factor
$a_f = (2t_c - t_b)/t_s$=Fuel filler gamma heat multiplication factor
$a_{bc} = t_{bc}/t_s$=Backclad gamma heat multiplication factor
$A_p$=Intercept in conductivity equation for prime specimen
$A_t$=Intercept in conductivity equation for TC's 1, 2
B=Slope in conductivity equation for specimens
1,2,P=Subscripts for $TC_1$, $TC_2$, prime specimen
AXF=Axial Factor for Gamma Heat
Power=Reactor power
$T_{MAX}$=Maximum temperature of backclad in a TC or $T_M$ for prime specimen
$T_c$=Temperature at interface between FF and outer clad in a TC or temperature at interface between FF and clad in a prime specimen
$\bar{k}$=Average thermal conductivity
$S_{BC}$=Backclad heat source
$T_{BC}$=Backclad temperature
$R_{TC}$=Measured scan count ratios of the thermocouple specimens
$R_P$=Measured scan count ratio of the prime specimen The following statement definitions are also helpful in understanding the derivation which follows:

$$\int_1^2 k\, dT = \bar{k} \Delta T = \bar{k}(T_2 - T_1) = S$$

where:

S=heat source term which is a function of fission and/or gamma heat plus the specimen material thicknesses.
$\bar{k}$=Average thermal conductivity $$\bar{k} = a + b\bar{T}$$

$\bar{T} = (T_2 + T_1)/2$ = AVERAGE TEMPERATURE BETWEEN SURFACES 2 AND 1 a, b=average material constants where the material may contain Zr, U235, etc.

As a result of an adiabatic heat surface in the backclad, the backclad heat source, denoted $S_{BC}$, depends only on the material gamma heat and the backclad thickness ($t_{bc}$). Since the thermocouple well is contained in the backclad (e.g., corresponding to backclad 22 of FIG. 2), it follows that $T_{BC}=(T_{MAX}+T_M)/2$, and, therefore, the temperature drop across the backclad can be considered constant throughout the derivation for a particular TC. Using the fact that the average thermal conductivity is assumed to vary similarly with temperature for both TC's (1 and 2), then $$(d\bar{k}/dT_L)_2 = (d\bar{k}/dT_L)_1 = (d\bar{k}/dT_L)_P$$

wherein, in this last equation, the P refers to a prime specimen.

As mentioned above, test holders such as the types F (2×3) and B (2×4), shown in FIGS. 1 and 4, generally contain two fueled thermocouple specimens (TC's 16) and one or more prime specimens (specimens 14). The derivation or proof set forth below is for simplest case whereby the conductivity in the fuel region is assumed to vary linearly with temperature. Conductivities for the clad and backclad are also assumed to vary linearly with temperature which is a very good assumption for Zr material. Moreover, the heat transfer is assumed as being one-dimensional. The composition of the prime specimen 14 and the TC's 16 was discussed previously. For purposes of the derivation which follows, it is assumed that all specimens have the same clad and backclad material and that the backclad 22 and clad 26 are Zr material with a linear conductivity temperature dependence. A further assumption is that dk/dT is the same for all fuel fillers.

In the derivation or proof which follows, equations for the clad and fuel regions are set up in turn. It should be noted that a thermal adiabatic surface occurs in the backclad region 22. Consequently, since the conductivity temperature dependence is known, the temperature drop to the fuel surface fuel filler 24 depends only on the backclad thickness ($t_{bc}$), gamma heat rate ($Q_G$), and the TC temperature reading in the backclad. Some of the variables in the equations are symbolic to facilitate the derivation.

Clad Region
Let $$k_c = a + bT_C; \quad k_s = a + bT_S; \quad T_S = T_W + \frac{Q_T}{H}$$

$$\bar{k}(T_C - T_S) = S_C; \quad \bar{k} = a + b(T_C + T_S)/2$$

$$S_C = \frac{t_c}{12}(Q_T - a_c Q_G); \quad T_L = (T_C + T_M)/2$$

$$a_c = t_c/t_s; \quad t_s = 2t_c + t_f + t_{bc}$$

It follows that $$k_c^2 - k_s^2 = 2bS_c \quad \text{Eq (1)}$$

By differentiation of Eq (1) and using the equation for $S_c$, then $$k_c \frac{dk_c}{dT_C} - k_s \frac{dk_s}{dT_C} = b\frac{t_c}{12}\frac{dQ_T}{dT_C} \quad Q_G = \text{constant} \quad \text{Eq (2)}$$

Since $$\frac{dk_s}{dT_C} = \frac{b}{H}\frac{dQ_T}{dT_C}; \quad \frac{dk_c}{dT_C} = b$$

or $$\frac{dQ_T}{dT_C} = \frac{k_C}{\frac{k_s}{H} + \frac{t_c}{12}}$$

Fuel Region
Let $$\bar{k}(T_M - T_C) = S_F; \quad S_F = \frac{t_f}{48}(Q_T - a_f Q_G)$$

By differentiation of the last equation and using Eq (2)

$$(T_M - T_C)\frac{d\bar{k}}{dT_C} - \bar{k} = \frac{t_f}{48}\frac{dQ_T}{dT_C} = \frac{t_f}{48}\frac{k_c}{\frac{k_s}{H} + \frac{t_c}{12}}$$

where $T_M$ is fixed and Eq (2) has been used. It follows that $$\frac{d\bar{k}}{dT_c} = \frac{\bar{k}}{T_M - T_C} + \frac{t_f}{48(T_M - T_C)}\frac{k_c}{\frac{k_s}{H} + \frac{t_c}{12}}$$

$$= \frac{S_F}{(T_M - T_C)^2} + \frac{t_f}{48(T_M - T_C)}\frac{k_c}{\frac{k_s}{H} + \frac{t_c}{12}}$$

Let $k_w = a + bT_w$, then $$S_F = \frac{t_f H}{48b}\left(\frac{bQ_T}{H} - \frac{ba_f Q_G}{H}\right) \quad \text{Eq (3)}$$

$$k_s = a + b\left(T_W + \frac{Q_T}{H}\right) = k_w + \frac{bQ_T}{H}$$

$$\frac{bQ_T}{H} = k_s - k_w$$

From rules of differentiation and noting that $T_L = (T_C + T_M)/2$ $$\frac{d\bar{k}}{dT_c} = \frac{d\bar{k}}{dT_L}\frac{dT_L}{dT_C} = \frac{1}{2}\frac{d\bar{k}}{dT_L} \quad \text{Eq (4)}$$

or $$\frac{1}{2}\frac{d\bar{k}}{dT_L} = \frac{t_f H(k_s - k_w - ba_f Q_G/H)}{48b(T_M - T_C)^2} + \frac{t_f k_c}{48(T_M - T_C)\left(\frac{k_s}{H} + \frac{t_c}{12}\right)}$$

By definition $$\left(\frac{d\bar{k}}{dT_L}\right)_2 = \left(\frac{d\bar{k}}{dT_L}\right)_1 \quad \text{Eq (5)}$$

Canceling constants it follows that $$Y_2 = \left[\frac{t_f H(k_s - k_w - ba_f Q_G/H)}{(T_M - T_C)^2} + \frac{t_f b k_c}{(T_M - T_C)\left(\frac{k_s}{H} + \frac{t_c}{12}\right)}\right]_{TC_2} \quad \text{Eq (6)}$$

$$= Y_1 \text{ for } TC_1$$

Next, we need to determine the variables $k_s$, $k_c$. From Eq (1) and Eq (3)

$$k_s^2 + 2bS_C - k_c^2 = 0$$

$$k_s^2 + \frac{2t_c H}{12}\left(\frac{bQ_T}{H} - \frac{ba_c Q_Q}{H}\right) - k_c^2 = 0$$

or $$k_s^2 + \frac{2t_c H}{12}\left(k_s - k_w - \frac{ba_c Q_G}{H}\right) - k_c^2 = 0$$

Solving the quadratic in $k_s$ yields $$k_s = \frac{-t_c H}{12} + \sqrt{\left(\frac{t_c H}{12}\right)^2 + \frac{2t_c H}{H}\left(k_w + \frac{ba_c Q_G}{H}\right) + k_c^2} \quad \text{Eq (7)}$$

Let $k_s + t_c H/12 = X$, $k_c = a + bT_c$ and $k_m = a + bT_M$. Note that the only unknown variable on the right side of Eq (7) is $k_c$. Eq (6) may be written in terms of $X$, $k_m$ and $k_c$ as follows $$Y_2 = b^2 t_f H\left[\frac{X - t_c H/12 - k_w - b a_f Q_G/H}{(k_m - k_c)^2} + \frac{k_c}{(k_m - k_c)X}\right]_{TC_2} \quad \text{Eq (8)}$$

$$= Y_1 \text{ for } TC_1$$

The total heat generation is $Q_T = Q_F + Q_G$. Since $$X = k_s + \frac{t_c H}{12} = a + b\left(T_w + \frac{Q_T}{H}\right) + \frac{t_c H}{12}$$

$$= k_w + \frac{bQ_G}{H} + \frac{t_c H}{12} + \frac{bQ_F}{H}$$

Then it follows that $$\frac{Q_{F_2}}{Q_{F_1}} = R_{TC} = \frac{H_2}{H_1} \frac{(X - k_w - bQ_G/H - t_c H/12)_{TC_2}}{(X - k_w - bQ_G/H - t_c H/12)_{TC_1}} \quad \text{Eq (9)}$$

Here $R_{TC}$ is the measured gamma scan ratio of the TCs. Equations (7), (8), (9) are independent. The $T_M$ as defined here is not the measured $T_{MAX}$ since there is a slight temperature rise to the middle of the backclad. The temperature $T_M$ as a function of $T_{MAX}$ is determined as follows.

$$\bar{k}_{bc}(T_{MAX} - T_M) = S_{BC}; S_{BC} = a_{bc} t_{bc} \frac{Q_G}{48}$$

and therefore $$\left(a + \frac{b}{2}(T_{MAX} + T_M)\right)(T_{MAX} - T_M) = S_{BC}$$

Hence $$\frac{b}{2}T_M^2 + aT_M - \left(aT_{MAX} + \frac{b}{2}T_{MAX}^2 - S_{BC}\right) = 0$$

Solving the resulting quadratic equation yields for $T_M$ $$T_M = \frac{-a + \sqrt{(a + bT_{MAX})^2 - a\frac{bt_{bc}Q_G}{24}}}{b} \quad \text{Eq (10)}$$

Since $T_{MAX}$ is measured, and all other quantities are known, the $T_M$ for the TC is determined as is $k_m = a + bT_M$. Noting that $k_c$ from Eq (7) may be written in terms of X, then $$k_c = \sqrt{X^2 - \left(\frac{t_c H}{12}\right)^2 - \frac{2t_c H}{12}\left(k_w + \frac{ba_c Q_G}{H}\right)} \quad \text{Eq (11)}$$

for either TC. Therefore, it follows Eq (8) that $$\frac{(t_f H)_{TC_2}\left[\frac{X - t_c H/12 - k_w - b a_f Q_G/H}{(k_m - k_c)^2} + \frac{k_c}{(k_m - k_c)X}\right]_{TC_2}}{(t_f H)_{TC_1}\left[\frac{X - t_c H/12 - k_w - b a_f Q_G/H}{(k_m - k_c)^2} + \frac{k_c}{(k_m - k_c)X}\right]_{TC_1}} = 1 \quad \text{Eq (12)}$$

$$\frac{H_2}{H_1} \frac{[X - k_w - bQ_G/H - t_c H/12]_{TC_2}}{[X - k_w - bQ_G/H - t_c H/12]_{TC_1}} = R_{TC} \quad \text{Eq (13)}$$

After applying Eq (11) to Eq (12), and using Eq (9) and (13) then the X value for either TC is determined. From the value of X and Eq (7), $k_s$, $k_c$ and hence $T_S$, $T_C$ are determined. Since, by definition $$Q_{T_1} = H_1(T_{S_1} - T_{W_1}); Q_{F_1} = Q_{T_1} - Q_{G_1} \quad \text{Eq (14)}$$

and similarly for $TC_2$. The $Q_F$ values are therefore determined. From the TC value ($T_{MAX}$), the delta T across the filler, $T_M - T_C$, is known. Since $$\bar{k} = \frac{S_F}{T_M - T_C} = \frac{t_f}{48}(Q_T - a_f Q_G) \quad \text{Eq (15)}$$

the value of $\bar{k}$ is hence determined for either TC. The additional required equation, namely, $Q_G$, may be written simply as $$Q_G = 25773 \times \text{POWER} \times 0.3 \times AXF \times t_S \quad \text{Eq (16)}$$

The above set of equations have been derived for the TC's. The following gives equations for the prime specimens. The gamma scan ratio of the prime specimen, $R_P$ is a measured quantity, i.e.

$$R_P = \frac{Q_{F_P}}{Q_{F_1}} \quad \text{Eq (17)}$$

Since $R_P$, $Q_{F_1}$ are known, the $Q_{F_P}$ is determined. From the specimen dimensions, $Q_{G_P}$ is found and hence $Q_{T_P}$. By analogy from the preceding equations for the CLAD region and FUEL region, the $T_{C_P}$, $T_{S_P}$ are readily found. Since there is no backclad for the prime specimen, $T_{M_P}$ is the maximum value. Therefore, for a linear temperature dependence of the thermal conductivity in the fuel filler, and noting that $$B = \left(\frac{d\bar{k}}{dT_L}\right)_P = \left(\frac{d\bar{k}}{dT_L}\right)_1$$

we have found from Eq (8)

$$Y_P = Y_1 = b^2 t_{C_P} H_P \left( \frac{X_P - t_{C_P} H_P / 12 - k_{w_P} - b a_{fp} Q_{G_P} / H_P}{(k_{m_P} - k_{c_P})^2} + \frac{k_{c_P}}{(k_{m_P} - k_{c_P}) X_P} \right) \quad \text{(Eq 18)}$$

Since $Y_1$ for $TC_1$ is known, and $X_p$, $k_{c_p}$ is determined from $T_{C_p}$, $T_{S_p}$, $Q_{T_p}$ then the only remaining variable in Eq (18) is $k_{m_p}$. Solving for $k_{m_p}$ which is the pseudo filler thermal conductivity for the prime specimen, and then using the following $$T_{M_P} = \frac{k_{m_P}}{b} - \frac{a}{b} \quad \text{Eq (19)}$$

and $$\bar{k}_P = \frac{S_{F_P}}{(T_{M_P} - T_{C_P})}$$

Since $$= \frac{t_{fp}}{48} \frac{(Q_{T_P} - a_{fp} Q_{G_P})}{(T_{M_P} - T_{C_P})} \quad \text{Eq (20)}$$

-continued $$\bar{k}_P = A_P + B(T_{M_P} + T_{C_P})/2 \quad \text{Eq (21)}$$

and $k_p$, $B$, $T_{M_p}$, $T_{C_p}$ are known, then the intercept $A_p$ for the prime specimen can be determined. Substituting the appropriate variables in Eq (21), the $A_i$ values for the TC's are similarly determined.

A computer program was written in MS pro-basic to run on an IBM type 486 computer. The program listing plus the input for the ATR SW101 and SE93 test trains are attached. A comparison of results with the measured results is given in Table 1. Following Table 1 is a listing of the prompts for input and the values entered for both of the disclosed embodiments. Lastly, there is a listing of the computer program itself.

TABLE 1

COMPARISON OF INVENTION WITH THE MEASURED RESULTS

| Specimen ID | $T_W$ M | $T_W$ I | $T_S$ M | $T_S$ I | $T_C$ M | $T_C$ I | $T_W$ M | $T_W$ I | $T_{WAX}$ M | $T_{WAX}$ I | $Q_E \times 10^{-6}$ M | $Q_E$ I | Percent Diff |
|---|---|---|---|---|---|---|---|---|---|---|---|---|---|
| SW101 |||||||||||||| 
| Prime | 224 | 224 | 467 | 472 | 828 | 840 | 1167 | 1142 | 1167 | 1142 | 2.01 | 2.05 | +2.0 |
| $TC_2$ | 221 | 221 | 447 | 454 | 781 | 794 | — | 1073 | 1084 | 1084 | 1.77 | 1.81 | +2.3 |
| $TC_1$ | 215 | 215 | 364 | 369 | 599 | 607 | — | 840 | 854 | 853 | 1.15 | 1.17 | +1.7 |
| SE93 ||||||||||||| 
| Prime | 492 | 492 | 558 | 559 | 764 | 767 | — | 935 | 936 | 935 | .836 | .846 | +1.2 |
| $TC_2$ | 492 | 492 | 558 | 559 | 714 | 718 | — | 901 | 909 | 910 | .784 | .794 | +1.3 |
| $TC_1$ | 489 | 489 | 543 | 543 | 672 | 674 | — | 837 | 845 | 846 | .633 | .641 | +1.3 |

Invention - I
Measured Results - M

PROMPTS FOR INPUT AND ENTERED VALUES

INPUT TRAIN ID, SPECIMEN ID'S PRIME TC, ALT TC SW101, XX, YY
INPUT POWER, GAMMA AXF, FISS RAT PRIME TO ALT TC, AND SIDE TO ALT TC 41, .939, 1.545, 1.751
INPUT BW, TMAX, HCOEF, THICC, THICF, THICBC, SWEL FOR PRIME TC 221, 1084, 8141, .0198, .064, .1453, 0
INPUT BW, TMAX, HCOEF, THICC, THICF, THICBC, SWEL FOR ALT TC 215, 853, 8141, .0195, .0637, .1458, .0048
INPUT SPEC ID, BW, HCOEF, THICC, THICF, THICBC, SWEL FOR SIDE SPECIMEN ZZ, 224, 8387, .0197, .0685, 0, .0334
INPUT TRAIN ID, SPECIMEN ID'S PRIME TC, ALT TC SE93, XX, YY
INPUT POWER, GAMMA AXF, FISS RAT PRIME TO ALT TC, AND SIDE TO ALT TC 31.8, .951, 1.2385, 1.3207

-continued

INPUT BW, TMAX, HCOEF, THICC, THICF, THICBC, SWEL FOR PRIME TC 492, 910, 12820, .0206, .0682, .1404, .02284
INPUT BW, TMAX, HCOEF, THICC, THICF, THICBC, SWEL FOR ALT TC 489, 846, 12900, .0204, .0682, .1403, .02728
INPUT SPEC ID, BW, HCOEF, THICC, THICF, THICBC, SWEL FOR SIDE SPECIMEN ZZ, 492, 13100, .0268, .0673, 0, .04053

PROGRAM LISTING

```
  9 OPEN "LPT1" FOR OUTPUT AS #1
 10 PRINT "INPUT TRAIN ID, SPECIMEN ID'S PRIME TC, ALT TC"
 20 INPUT Idt$, Id2$, Id1$
 30 PRINT "INPUT POWER, GAMMA AXF, FISS RAT PRIME TO ALT TC, AND SIDE TO ALT TC"
 40 INPUT P, Axf, R, Rs
 50 IF Axf > 1 THEN Axf = COS(.05775 * Axf)
 60 PRINT "INPUT BW, TMAX, HCOEF, THICC, THICF, THICBC, SWEL FOR PRIME TC"
 70 INPUT Tw2, Tmax2, H2, Tc2, Tf2, Tbc2, Sw2
 80 INPUT "INPUT BW, TMAX, HCOEF, THICC, THICF, THICBC, SWEL FOR ALT TC"
 90 INPUT Tw1, Tmax1, H1, Tc1, Tf1, Tbc1, Sw1: REM Sw1 = 0.273: SW2 = .0228
100 A = 6: B = .005; Ab = A/B: Tf2s = Tf2*(1 + Sw2): Tf1s = TF1*(1 + Sw1)
110 Ts2 = 2*Tc2 + Tf2 + Tbc2: Qg2 = 25773*P.3*Axf*Ts2: Kw2 = A + B*Tw2: Kch2 = Tc2*H2/12
120 Ts1 = 2*Tc1 + Tf1 + Tbc1: Qg1 = 25773*P.3*Axf*Ts1: Kw1 = A + B*Tw1: Kch1 = Tc1*H1/12
130 Kfh2 = Tf2*H2/48: Kfh1 = Tf1*H1/48: Kgh2 = B*Qg2/H2 Kgh1 = B*Qg1/H1: Kwb1 = Kw1 + Kgh1
140 Ac2 = Tc2/Ts2: Af2 = (2*Tc2 - Tbc2)/Ts2: Kwb2 = Kw2 + Kgh2
150 Ac1 = Tc1/Ts1: Af1 = (2*Tc1 - Tbc1)/Ts1
160 Kwc2 = Kw2 + Ac2*Kgh2: Kwc1 = Kw1 + Ac1*Kgh1: Kwf2 = Kw2 + Af2*Kgh2: Kwf1 = Kw1 + Af1*Kgh1
170 Al1 = Kfh1*KWf1: G1 = Kch1 + Kwf1: G12 = Kch2 + Kwf2: G3 = Kch1 ^2 + 2*Kch1*Kwc1: G31 = G3
180 G32 = Kch2^2 + 2*Kch2*Kwc2: : P1 = Kwb1 + Kch1: P2 = Kwb2 + Kch2: Pw1 = Kwc1/B: Pw2 = Kwc2/B
190 Ph1 = (Kwc1 + .5*Kch1)/B: Ph2 = (Kwc2 + .5*Kch2)/B
200 IF Rs = 0 THEN 260
210 PRINT "INPUT SPEC ID, BW, HCOEF, THICC, THICF, THICBC, SWEL FOR SIDE SPECIMEN"
220 INPUT Ids$, Tws, Hs, Tcs, Tfs, Tbcs, Sws: REM Sws = .0405: Tfss = Tfs*(1 + Sws)
230 Tst = 2*Tcs + Tfs + Tbcs: Qgs = 25773*P.3*Axf*Tst: Acs = Tcs/Tst: Afs = (2*Tcs - Tbcs)/Tst
240 Kchs = Tcs*Hs/12: Kfhs = Tfs*Hs/48: Kghs = B*Qgs/Hs: Kws = A + B*Tws: Kwcs = Kws + Acs*Kghs
250 Kwbs = Kws + Kghs
260 PRINT #1, : PRINT #1, "*******THE TRAIN ID IS"; Idt$; "********"
270 PRINT #1, : PRINT #1, "SPECIMEN ID FOR PRIME ALT TC'S ARE": Id2$; "AND"; Id1$
280 IF Rs <> 0 THEN PRINT #1, "SPECIMEN ID FOR SIDE SPECIMEN IS"; Ids$
290 REM*******DETERMINED BCLAD DT AND FUEL/BCLAD INTERFACE TEMPERATURE********
300 Tm2 = (-A + SQR((A + B*Tmax2)^2-B*Qg2*Tbc2^2/(24*T12)))/B: Dtb2 = Tmax2 - Tm2
310 Tm1 = (-A + SQR((A + B*Tmax1)^2-B*Qg1*Tbc1^2/(24*Ts1)))/B: Dtb1 = Tmax1 - Tm1
320 PRINT #1, : PRINT #1, "AXF ="; Axf; "tm2 ="; Tm2: "dtb2 ="; Dtb2; "tm1 ="; Tm1; "dtb1 ="; Dtb1
330 Kc1 = A + .002*Tm1: Dk = .001: Km2 = A + B*Tm2: Km1 = A + B*Tm1
340 C3 = Kwf2^2 + Kch2*Kgh2*(Af2 - Ac2) - Km2^2: C4 = Kwf1^2 + Kch1*Kgh1*(Af1 - Ac1) - Km1^2
350 FOR M = 1 TO 1000
360 Tcn1 = Kc1/B - Ab: Ks1 = -Kch1 + SQR(Kch1^2 + 2*Kch1*(Kw1 + Ac1*Kgh1) + Kc1^2)
370 Tsx1 = Ks1/B - Ab: Ks2 = Kw2 + (Ks1 - Kw1 - Kgh1)*R*H1/H2 + Kgh2: Tsx2 = Ks2/B - Ab
380 Qt1 = H1*(Tsx1 - Tw1): Qf1 = Qt1 - Qg1: Qt2 = H2*(Tsx2 - Tw2): Qf2 = Qt2 - Qg2
390 Qct1 = Qt1 - AC1*Qg1: Qct2 = Qt2 - Ac2*Qg2: Qft1 = Qt1 - Af1*Qg1: Qft2 = Qf2 - Af2*Qg2
400 Dt1 = Tm1 - Tcn1: S2 = Tf2*Qft2/48: S1 = Tf1*Qft1/48: K1 = S1/Dt1
410 Kc2 + SQR(Ks2^2 + 2*Kch2*(Ks2 - Kwc2)): Tcn2 = Kc2/B - Ab: Dt2 = Tm2 - Tcn2: K2 = S2/Dt2
420 Y2 = B*Kfh2*((Ks2 - Kwf2)/(Km2 - Kc2)^2 + Kc2/((Km2 - Kc2)*(Ks2 + Kch2)))
430 Y1 = B*Kfh1*((Ks1 - Kwf1(/(Km1 - Kc1)^2 + Kc1/((Km1 - Kc1)*(Ks1 + Kch1))):Ra = Y2/Y1
440 IF ABS(Ra - 1) < .001 THEN 480
450 IF M = 1 THEN 470
460 S1 = (1 - Ra)/(Ra - Rao): Kc1 = Kc1 + .5*S1*Dk: Me = M + S1: REM PRINT M; Me; Ra; Kc1; K2; K1
470 Kc1 = Kc1 + Dk: Y1o = Y1: Y2o = Y2: Rao = Y2o/Y1o: NEXT M
480 IF Rs = 0 THEN 560
490 Kss = Kws + (Ks1 - Kw1 - Kgh1)*Rs*H1/Hs + Hghs: Tsxs = Kss/B - Ab
500 Kcs = SQR(Kss^2 + 2*Kchs*(Kss - Kws - Acs*Kghs)) Tcns = Kcs/B - Ab
510 Ps = B*Kfhs*Kcs/(Kss + Kchs)
520 Kms = Kcs + .5*(Ps + SQR(Ps^2 + 4*Y1*B*Kfhs*(Kss - Kws - Afs*Kghs)))/Y1
530 Tms = Kms/B - Ab: Qfs = Rs*Qf1: Qts = Qfs + Qgs: Qfts = Qts - Afs*Qgs
540 Tmaxs = (-A + SQR((A + B*Tms)^2 + B *Qgs*Tbcs^2/(24*Tst)))/B: Dtbs = Tmaxs - Tms
550 Ks = Tfs*Qfts/(48*(Tms - Tcns)): PRINT #1, "TINTS ="; Tcns; "TMAXS ="; Tmaxs
560 PRINT #1, "_____"
570 PRINT #1, "THE FOLLOWING VALUES WERE FOUND AFTER" M; "ITERATIONS"
580 PRINT #1, "me, RAT"; Me; Ra; "K2 ,K1, Ks"; K2; K1; Ks; "QF2, QF1, QFS"; Qf2, Qf1; Qfs
590 PRINT #1, "TSX1, TSX2, TSXS, TCN1, TCN2, TCNS"; Tsx1; Tsx2; Tsxs; Tcn1; Tcn2; Tcns
600 T1 = .5*(Tm1 + Tcn1): T2 = .5*(Tm2 + Tcn2): Q = Tf2*Qft2*(Tm1 - T1)/(Tf1*Qft1*(Tm2 - T2))
610 S1 = (K2 - K1)/(T2 - T1): PRINT "SLOPE ="; S1; "INT ="; (T2 - Q*T1)*S1/(Q - 1)
620 Rh = H1*R/H2: Bb1 = Kch1*(Kch1 + 2*Kwc1): Ff = Kch2 + Kwb2 - Rh*(Kch1 + Kwb1)
630 Bb2 = Kch2*(Kch2 + 2*Kwc2): Kc1 = A + B*Tcn1: U1 = (Kc1^2 + Bb1)*Rh^2: Kc2o = Kc2
640 U2 = (Ff + SQR(U1))^2: Kc2 = SQR(U2 - Bb2): Tcn2n = Kc2/B - Ab: K2ra = K2/K1
650 Cc = Tf2*Qft2/(Tf1*K2ra*Qft1): Sx = (Cc/Rh)^2 - 1: Ax = Sx^2: Kmd2 = (Km2 - Cc*Km1)^2
660 Hh = Ff^2 - Kmd2 + Bb1*Cc^2 - Bb2: Cx = Hh^2 + 4*Bb1*Kmd2*Cc^2
670 Bx = -4*Kmd2*(Cc/Rh)^2 - 2*Hh*Sx = 4*Ff^2: G4 = Ax^2: G3 = 2*Ax*Bx - 16*(Sx*Ff)^2
680 G2 = Bx^2 + 2*Cx*Ax + 32*Hh*Sx*Ff^2: G1 = 2*Bx*Cx - 16*(Hh*Ff)^2: G0 = Cx^2
681 Gx = SQR(SQR(G0)): Y1 = U1/Gx: G3 = G3/Gx: G2 = G2/Gx^2: G1 = G1/Gx^3: G0 = 1: Y1 = .9086
690 Eq = G4*Y1^4 + G3*Y1^3 + G2*Y1^2 + G1*Y1 + G0: PRINT Eq; G4; G3; G2; G1; G0
700 PRINT #1, Kc2o; Kc2; Tcn2; Tcn2n; Tcn2n - Tcn2
```

-continued

```
701 PRINT #1, Kc1; SQR(U1/Rh^2 - Bb1); Tcn1; SQR(U1/Rh^2 - Bb1)/B - Ab
702 PRINT #1, : PRINT #1, "THE ABOVE FLUX ESTIMATES ARE THE LEAST REQUIRED CALCULATION"
703 PRINT #1, : "*********************************************"
704 PRINT
710 REM*******FIND INITIAL INTERCEPT AND SLOPE FOR CONDUCTIVITY EQUATION*****
720 REM NOTE K2 VERSUS K1 IS GENERAL; T2 - T1 DEPENDS ON LINEAR AVERAGE
730 REM PRINT "INPUT INITIAL KBAR1 ESTIMATE": INPUT K1
740 L = L + 1: PRINT #1, : PRINT #1, "-------FOR L ="; L; "-------"
750 F1 = .5*Kch1 + Kfh1*(Km1 + A11/K1)/K1
760 Term = (1 - (Kfh1/K1)^2)*(Kch1*Kwc1 + (Km1 + A11/K1)^2)
770 G1 = (-F1 + SQR(F1^2 + Term))/(1 - (Kfh1/K1)^2) - Kwb1
780 Krgh = R*G1*H1/H2: S = Kwb2 + Krgh
790 D1 = SQR((S + .5*Kch2)^2 - .5*Kch2*(.5*Kch2 + 2*Kwc2))
800 K2t = Kfh2*(Krgh + Kwb2 - Kwf2)/(Km2 - D1)
810 B3 = (Kwf2 + .5*Kch2 + Kfh2*Km2/K2)*2*B*K2/Kfh2
820 B4 = (Kwf1 + .5*Kch1 + Kfh1*Km1/K1)*2*B*K1/Kfh1
830 A3 = 4*B^2*((K2/Kfh2)^2 - 1): A4 = 4*B^2*((K1/Kfh1)^2 - 1)
840 IF L = 1 THEN 860
850 Sloo = Slo: T2o = T2: T1o = T1: Tcno2 = Tcn2: Tcno1 = Tcn1
860 T2 = Tm2 + B3/A3 + SQR((B3/A3)^2 - C3/A3): T1 = Tm1 + B4/A4 + SQR((B4/A4)^2 - C4/A4)
870 Slo = (K2 - K1)/(T2 - T1)
880 Q = Tf2*Qft2*(Tm1 - T1)/(Tf1*Qft1*(Tm2 - T2)): Nt = (T2 - Q*T1)*Slo/(Q - 1)
890 PRINT #1, : PRINT #1, "********SLOPE ="; Slo; "INT ="; Nt; "*******": PRINT #1,
900 PRINT #1, : Qt2 = Qft2 + Af2*Qg2: Qtl = Qft1 + Af1*Qg1: Qf2 = Qt2 - Qg2: Qf1 = Qt1 - Qg1
910 S2 = Tf2*Qft2/48: S1 = Tf1*Qft1/48
920 PRINT #1, "K2 ="; K2; "K1 ="; K1; "\QF2"; Qf2; "QF1 ="; Qf1
930 PRINT #1, "QT2 ="; Qt2; "Qt1 ="; Qt1; "\QFT2 ="; Qft2; "QFT1 ="; Qft1
940 PRINT #1, "R ="; R; "R EST ="; Qf2/Qf1; "R RATIO ="; R*Qf1/Qf2
950 PRINT #1, "S2 ="; S2; "S1 ="; S1; "\TBR2 ="; T2; "TBR1 ="; T1
960 Cc = 1: Qfol = Qf1: FOR M = 1 TO 200
970 IF M > = 2 THEN Cc = .9999*Cc
980 Qf1 = Cc*Qfo1: Qf2 = R*Qf1
990 Qt1 = Qf1 + Qg1: Qt2 = Qf2 + Qg2: Qct1 = Qt1 - Ac1*Qg1: Qct2 = Qt2 - Ac2*Qg2
1000 Tsx1 = Tw1 + Qt1/H1: Tcx1 = -Ab + SQR(Ab^2 + Tsx1^2 + 2*Ab*Tsx1 + 2*Tc1*Qct1/(12*B))
1010 Tsx2 = Tw2 + Qt2/H2: Tcx2 = -Ab + SQR(Ab^2 + Tsx2^2 + 2*Ab*Tsx2 + 2*Tc2*Qct2/(12*B))
1020 Ps2 = Qf1 *R/H2 + (Kwb2 + .5 *Kch2)/B: Tcn2 = -Ab + SQR(Ps2^2 - Ph2^2 + Pw2^2)
1030 Ps1 = Qf1/H1 + (Kwb1 + .5*Kch1)/B: Tcn1 = -Ab + SQR(Ps1^2 - Ph1^2 + Pw1^2)
1040 S2 = Tf2*(R*Qf1 + (1 - Af2)*Qg2)/48: S1 = Tf1*(Qf1 + (1 - Af1)*Qg1)/48
1050 Nu = (Tcn2^2 - Tm2^2 + 2*S2/B)*(Tm1 - Tcn1): Den = (Tcn1^2 - Tm1^2 + 2*S1/B)*(Tm2 - Tcn2)
1060 Ratio = Nu/Den: K2 = Tf2*(Qf2 + (1 - Af2)*Qg2)/(48*(Tm2 - Tcx2))
1070 K1 = Tf1*(Qf1 + (1 - Af1)*Qg1)/(48*(Tm1 - Tcx1))
1080 K2 = Tf2*(Qf2 + (1 - Af2)*Qg2)/(48*(Tm2 - Tcx2))
1090 IF M > = 2 THEN Cc = Cc + .5*(1 - Ratio)*(Cc - Cco)/(Ratio - Rato)
1100 Rato = Ratio: Cco = Cc
1110 IF ABS(Ratio - 1) < = .0001 THEN 1130
1120 NEXT M
1130 PRINT #1, "-------------------------------------------"
1140 PRINT #1, "THE FOLLOWING VALUES WERE FOUND FOR L ="; L, "AFTER"; M; "ITERATIONS"
1150 PRINT #1, "C, Rat"; Cc; Ratio; "K2, K1"; K2; K1; "QF2, QF1"; Qf2; Qf1; "K2R"; K2t/K2
1160 Qft1 = Qf1 + (1 - Af1)*Qg1: Qft2 = Qf2 + (1 - Af2)*Qg2: Tcxo2 = Tcx2: Tcxo1 = Tcx1
1170 IF L = 1 THEN 1500
1180 Qf2 = Qt1 + Qg2: Qt1 = Qf1 + Qg1
1190 C2 = B*Tf2*H2/(K2t*48): D2 = Km2 + Af2*C2*Qg2/H2
1200 Term2 = C*D2 + B*Kw2 + 4*Tc2*C2*K2t/Tf2
1210 Term22 = D2^2 - Kw2^2 + 8*Tc2*K2t*C2*Ac2*Qg2/H2
1220 Qf2 = H2*(Term2 - SQR(Term2^2 - (C2^2 - B^2)*Term22))/(C2^2 - B^2) - Qg2:Qf1 = Qf2/R
1230 Qt1 = Qf1 + Qg1: Tcx1 = SQR((Kw1 + B*Qt1/H1)^2 + 2*B*Tc1*(Qt1 - Ac1*Qg1)/12)/B - Ab
1240 Qt2 = Qf2 + Qg2: Tcx2 = Tm2 - Tf2*(Qt2 - Af2*Qg2)/(48*K2t)
1250 K1t = Tf1*(Qt1 - Af1*Qg1)/(48*(Tm1 - Tcx1)): K1 = K1t
1260 K2 = Tf2*(Qt2 - A12*Qg2)/(48*(Tm2 - Tcx2))
1270 Qft2 = Qt2 - Af2*Qg2: Qft1 = Qt1 - Af1*Qg1: Qct2 = Qt2 - Ac2*Qg2: Qct1 = Qt1 - Ac1*Qg1
1280 Dd = S2*K1/(S1*K2):Tcx2c = Tm2 - Tm1*Dd + Dd*Tcx1
1290 Gf = (Tm2*Tcx2 - Tm1*Tcx1)/(T2 - T1): Gfo = (Tm2*Tcxo2 - Tm1*Tcxo1)/(T2o - T1o)
1300 Ks1 = A + B*(Tw1 + Qt1/H1): Dt1 = Tm1 - Tcx1: Y1 = Tf1*H1*(Ks1 - Kw1 - B*Af1*Qg1/H1)/Dt1^2
1310 Kcx1 = A + B*Tcx1: Y1 = Y1 + Tf1*B*Kcx1/(Dt1*(Ks1/H1 + Tc1/12)): Kcx2 = A + B*Tcx2
1320 Ks2 = A + B*(Tw2 + Qt2/H2): Dt2 = Tm2 - Tcx2: Y2 = Tf2*H2*(Ks2 - Kw2 - B*Af2*Qg2/H2)/Dt2^2
1330 Y2 = Y2 + Tf2*B*(A + B*Tcx2)/(Dt2*(Ks2/H2 + Tc2/12)): PRINT "Y2, Y1"; Y2; Y1; Y2/Y1
1340 X1 = SQR(G31 + Kcx1^2): Z1 = 2*X1
1350 Kcx = SQR((P2 + (X1 - P1)*H1*R/H2)^2 - G32): X2 = SQR(G32 + Kcx^2): Z2 = 2*X2
1360 Trad = Km2 - SQR((2*G32 + Km2^2 + Kcx^2 - Z2*G12)/(1 + Z2*Y1/(B^2*Tf2*H2))): Trat = Kcx/Trad
1370 PRINT #1, "TRAT1 ="; Trat
1380 1F Rs = 0 THEN 1500
1390 Qfs = Rs*Qf1:Qts = Qfs + Qgs: Qfcs = Qts - Acs*Qgs: Qffs = Qts - Afs*Qgs
1400 Tss = Tws + Qts/Hs: Tes = -Ab + SQR(Tss + Ab)^2 + 2*Tcs*Qfcs/(12*B)): Tsum1 = Tm1 + Tcx1
1410 Tcb = K1/Slo: Tps = Tcb - Tsum1/2: Tms = -Tps + SQR((Tps + Tes)^2 + 2*Tfs*Qffs/(48*Slo))
1420 F1 = .5*Kch1 + Kfh1*(Km1 + A11/K1)/K1
1430 Term = (1 - (Kfh1/K1)^2)*(Kch1*Kwc1 + (Km1 + A11/K1)^2)
1440 G1 = (-F1 + SQR(F1^2 + Term))/(1 - (Kfh1/K1)^2) - Kwb1:Krghs = Rs*G1*H1/Hs
1450 Fs = Tfs*Hs*(Krgs + (1 - Afs)*Kghs): Kws = A + B*Tws
1460 Ss = Kwbs + Krghs: Srs = Tfs*Qffs/48
```

-continued

```
1470 Ds = SQR(Ss + .5*Kchs)^2 - .5*Kchs*(.5*Kchs + 2*Kwcs))
1480 Tmss = ((Ds - A)*Tfs*Qfffs - Fs*Tes)/(B*Tfs*Qffs - Fs)): K = Tfs*Qffs/(48*(Tmss - Tes))
1490 PRINT #1, "TRUE TMAX ="; Tmss; "TRUE KBARS ="; K; K2: K2t
1500 IF ABS(K2 - K2t) < .001 THEN 1521
1510 IF L = 2 THEN 1521
1520 GOTO 740
1521 LPRINT CHR$(27) + "E"
1530 PRINT #1, "----------------------------------------"
1540 PRINT #1, "********TEMPERATURES FOR PRIME TC*******"
1550 PRINT #1, "BW2 ="; Tw2; "TSURF2 ="; Tsx2; "TINT2 ="; Tcx2; "TM2 ="; Tm2; TMAX2 ="; Tmax2
1560 PRINT #1, "DTS2 ="; Tsx2 - Tw2; "DTC2 ="; Tcx2 - Tsx2; "DTF2 ="; Tm2 - Tcx2; "DTBC2 ="; Dtb2
1570 PRINT #1, : PRINT #1, "********TEMPERATURES FOR ALTERNATE TC*******"
1580 PRINT #1, "BW1 ="; Tw1; "TSURF ="; Tsx1; "TINT1 ="; Tcx1; "TM1 ="; Tm1; "TMAX ="; Tmax1
1590 PRINT #1, "DTS1 ="; Tsx1 - Tw1; "DTC1 ="; Tcx1 - Tsx1; "DTF1 ="; Tm1 - Tcx1; "DTBC1 ="; Dbt1
1600 PRINT #1, : PRINT #1, "********FLUXES FOR BOTH TC'S*******"
1610 PRINT #1, "QT2 ="; Qt2; "QT1 ="; Qt1; "QF2 ="; Qf2; "QF1 ="; Qf1; "QG2 ="; Qg2; "QG1 ="; Qg1
1620 PRINT #1, : PRINT #1, "********CONDUCTIVITIES AND TBAR'S FOR BOTH TC'S"
1630 PRINT #1, "KBAR2 ="; K2; "KBAR1 ="; K1: Tb12 = Tcx2 + .5*S2/K2:Tb11 = Tcx1 + .5*S1/K1
1640 PRINT #1, "TBLIN2 ="; Tbl2; Tm2 - Dd*Tm1 + Dd*Tbl1; "TBLIN ="; Tbl1
1650 Tt2 = .5*(Tm2 + Tcx2): Tt1 = .5*(Tm1 + Tcx1)
1660 IF Rs = 0 THEN 1780
1670 IF Tbcs = 0 THEN 1690
1680 Kms = A + B*Tms: Tmaxs = (-A + SQR(Kms^2 + 2*B*Qgs*Tbcs^2/(24*Tst)))/B:Bs = Tmaxs - Tms
1690 PRINT #1, "----------------------------------------"
1700 PRINT #1, "PRINT #1, "********TEMPERATURES FOR SIDE SPECIMEN*******"
1710 PRINT #1, "BWS ="; Tws; "TSURFS ="; Tss; "TINTS ="; Tes; "TMS ="; Tms; "TMAXS ="; Tms + Bs
1720 PRINT #1, "DTSS ="; Tss. - Tws; "DTCS ="; Tes - Tss; "DFTS ="; Tms - Tes; "DTBCS ="; Bs
1730 PRINT #1, : PRINT #1, "********FLUXES FOR SIDE SPECIMEN*************"
1740 PRINT #1, "QTS ="; Qts; "QFS ="; Qfs; "QGS ="; Qgs: Tbar1 = .5*(Tes + Tms): Zqs = Tbar1*Dq
1750 PRINT #1, : PRINT #1, "********CONDUCITIVITIES AND TBAR'S FOR SIDE SPECIMEN*******"
1760 Ks = Tfs*Qffs/(48*(Tms - Tes)): PRINT #1, "KBARS ="; Ks: Sqs = 1 + (Tms/Tbar1 - 1)^2/3
1770 PRINT #1, "TBLINS ="; Tbar1; "TBARS ="; Tbar1*(1 + Zqs*Sqs)/(1 + Zqs)
1780 STOP
```

Although the present invention has been described to specific exemplary embodiments thereof, it will be understood by those skilled in the art that variations and modifications can be effected in these exemplary embodiments without departing from the scope and spirit of the invention.

I claim:

1. A method for determining the absolute value of fission flux of a prime fuel-bearing specimen containing Uranium 235 inserted into a test holder of a nuclear reactor, said method comprising:

inserting into said test holder of said nuclear reactor at least one prime specimen, a plurality of bulk water channels and at least two thermocouple test specimens, said thermocouple test specimens being positioned at the same level in said test holder and comprising first and second outer clads, a central backclad and first and second fuel fillers disposed between respective outer clads and said backclad;

determining the temperature of said thermocouple test specimens and said bulk water channels, the gamma scan count ratios for said thermocouple test specimens and said at least one prime specimen, the thicknesses of said outer clads, said fuel fillers and said backclad of said thermocouple test specimens, and the water channel heat transfer coefficient of the thermocouple test specimens;

calculating, using the temperatures of said thermocouple test specimens, the ratio of the gamma scan counts of said thermocouple test specimens, the temperature of the bulk water channels, the thicknesses of said outer clads, said fuel fillers and said backclad of said thermocouple test specimens, and said surface water channel heat transfer coefficient, the absolute value of the fission heat fluxes for the thermocouple test specimens; and calculating, using the absolute value of the fission heat fluxes for the thermocouple test specimens and the gamma scan ratio for said at least one prime specimen, the absolute value of the fission heat flux for the prime specimen.

2. A method of claim 1 further comprising determining the reactor lobe power and axial factor for gamma heat and using the lobe power and axial factor so determined to separate fission heat from total heat in determining the absolute value of the fission heat flux for said thermocouple test specimens.

3. A method according to claim 1 wherein determining said water channel heat transfer coefficient comprises determining a measured flow heat rate and deriving said water channel heat transfer coefficient.

4. A method for determining the absolute value of fission flux of a prime fuel-bearing specimen containing Uranium 235 inserted into a test holder of a nuclear reactor, said method comprising:

inserting into said test holder a specimen assembly comprising a plurality of bulk water channels, at least one prime specimen comprising a prime fuel filler disposed between first and second prime clads, and at least two thermocouple specimens positioned at the same level as each other in said test holder, said thermocouple specimens comprising first and second outer clads, a central backclad and first and second fuel fillers disposed between respective outer clads and said backclad;

determining the temperature of said thermocouple test specimens and said bulk water channels, the gamma scan count ratios for said thermocouple test specimens and said at least one prime specimen, the thicknesses of said outer clads, said fuel fillers and said backclad of said thermocouple test specimens, the surface water channel heat transfer coefficient of the thermocouple test specimens, the reactor lobe power, and axial factor for gamma heat;

using the temperatures of said thermocouple test specimens, the ratio of the gamma scan counts of said thermocouple test specimens, the temperature of the bulk water channels, the thicknesses of said outer clads, said fuel fillers and said backclad of said thermocouple test specimens, said surface water channel heat transfer coefficient, the reactor lobe power, and axial factor for gamma heat, to calculate the absolute value of the fission heat fluxes for the thermocouple test specimens; and using the absolute value of the fission heat fluxes for the thermocouple test specimens and the gamma scan ratio for said at least one prime specimen, to calculate the absolute value of the fission heat flux for the prime specimen.

5. A method according to claim 4 wherein said prime specimen is disposed between a pair of said plurality of water channels, and each of said thermocouple test specimens is separately disposed between a pair of said plurality of water channels.

* * * * *